United States Patent [19]

Haas et al.

[11] 3,857,968

[45] Dec. 31, 1974

[54] METHOD OF PREPARING ANIMAL FOOD OF INCREASED PALATABILITY

[75] Inventors: Gerhard Julius Haas, Woodcliff Lake, N.J.; Joaquin Castro Lugay, Thornwood, N.Y.

[73] Assignee: General Foods Corporation, White Plains, N.Y.

[22] Filed: Apr. 18, 1974

[21] Appl. No.: 461,831

Related U.S. Application Data

[63] Continuation-in-part of Ser. No. 346,364, March 29, 1973, abandoned.

[52] U.S. Cl. ................... 426/33, 426/56, 426/63, 426/362, 426/364, 426/805
[51] Int. Cl. ............................................. A23k 1/10
[58] Field of Search ........... 426/33, 56, 59, 63, 149, 426/203, 212, 362, 382, 805

[56] References Cited
UNITED STATES PATENTS 3,615,694  10/1971  O'Donnell.......................... 426/364
3,650,768  3/1972  Roberts............................... 426/33

Primary Examiner—A. Louis Monacell
Assistant Examiner—R. A. Yoncoskie
Attorney, Agent, or Firm—Thaddius J. Carvis; Daniel J. Donovan

[57] ABSTRACT

The palatability of animal foods is increased by incorporating therein an effective amount of a palatability improving composition comprising fat and protein which has been conditioned by emulsifying the fat and treating the mixture with an enzyme mixture comprising lipase and protease. For dry animal foods, a fat such as bleachable fancy tallow or butter oil is preferably emulsified with a proteinaceous emulsifier, subjected to the action of the enzyme mixture and then sprayed onto the animal food as an emulsion. For intermediate moisture animal foods, a meat slurry is preferably treated with the enzyme mixture and then combined with the other ingredients of the animal food.

41 Claims, No Drawings

3,857,968

METHOD OF PREPARING ANIMAL FOOD OF INCREASED PALATABILITY

BACKGROUND OF THE INVENTION

This application is a continuation-in-part of copending U.S. application Ser. No. 346,364, filed Mar. 29, 1973, now abandoned, and it is related to subject matter disclosed and claimed in copending U.S. application Ser. No. 346,362, filed Mar. 29, 1973. The present invention relates to animal foods, and, more particularly, to methods for producing animal foods having increased palatability.

There is a continuing effort being made to develop processes and formulations which increase the palatability of animal foods while at the same time maintaining their nutritional value. While the development and production of nutritious animal foods has posed few problems to the art, there is a continuing problem of making these formulations palatable. Where the foods are unpalatable, animals often pass up the offered foods and do not take advantage of their nutritional value.

SUMMARY OF THE INVENTION

Accordingly, it is an object of the present invention to provide an animal food of improved palatability.

It is a further object of the present invention to provide a process for improving the palatability of animal food.

These and other objects are accomplished according to the present invention by incorporating into an animal food an effective amount of a palatability improving composition comprising fat and protein which has been conditioned by emulsifying the fat and treating the mixture with an enzyme mixture comprising lipase and protease.

DETAILED DESCRIPTION OF THE INVENTION

Animal foods normally contain from about 4 to 16 weight percent fat. Any portion or all of this fat content, can be conditioned, it being necessary to the present invention only to provide an effective amount of the conditioned mixture of fat and protein (i.e., the palatability improving composition) for increasing the palatability of the animal food. The mixture of fat and protein can be conditioned separately, or any portion of the total animal food composition comprising both fat and protein can be subjected to the action of the enzyme mixture if desired.

The palatability improving composition can be incorporated into the animal food in any suitable manner. Thus, where the complete animal food or a portion thereof is conditioned, the palatability improving composition is incorporated by producing it in situ. Or, the palatability improving composition can be prepared separately from the remainder of the animal food and then mixed with or applied to the animal food. These procedures will be discussed in more detail below.

The fats employed in the mixture comprising fat and protein according to the present invention are preferably animal fats such as those naturally present in meats, bleachable fancy tallow, chicken fat, butter oil and lard. While other fats can be employed, butter fat and bleachable fancy tallow are preferred. It will be apparent to those skilled in the art that certain fats and oils such as cocoa butter, which, naturally or after conditioning, are unpalatable to animals, are not preferred according to the present invention.

The protein employed in the mixture comprising fat and protein can be any of those available in quantity at a reasonable cost. Where an emulsifier is added to the reaction mixture, it is preferable to employ a proteinaceous emulsifier which both supplies the protein and effects emulsification. Also, a meat slurry or other proteinaceous ingredient of the animal food may supply the necessary protein.

The process for conditioning the mixture of fat and protein according to the present invention broadly comprises emulsifying the fat and treating the mixture with an enzyme mixture comprising lipase and protease. The reaction between the emulsified fat-protein mixture and the enzyme mixture is presently believed to produce a complex array of reaction products. The fat reacts with the lipase to produce free fatty acids and mono- and diglycerides. The protein reacts with the protease to produce polypeptides and free amino acids. It is further possible that other reactions occur. The exact reactions and reaction products responsible for the unexpected improvement in the palatability of animal foods which is effected by the present invention are not presently identifiable. However, the reaction between the emulsified fat-protein mixture and the enzyme mixture produces a real and reproduceable improvement, and applicants do not wish to be bound to any specific theory as to which particular reaction or reaction product brings about the desired result of the present invention.

It is presently considered necessary to emulsify the fat before treatment with the enzyme mixture. This is due to the fact that emulsification increases the fat-water interfacial area, thereby facilitating the heterogeneous reaction between the fat and the lipase. Emulsification can be obtained through the addition of an emulsifier; or, as in the case where the fat-protein mixture comprises a meat slurry, the meat slurry will impart a limited natural emulsifying effect. Where an emulsifier is added, it is preferably proteinaceous. Promine D soy isolate, available from Central Soya, is a particularly preferred proteinaceous emulsifier for use according to the present invention. While the exact concentration of the emulsifier is not presently believed critical, it is typically employed in amounts ranging from about 0.5 to 20 percent by weight based on the weight of the fat.

The enzyme mixture comprising lipase and protease employed according to the present invention may be derived from any suitable source as long as it contains effective amounts of both lipase and protease when used at concentrations which will not adversely affect the palatability of the animal food. Preferably the enzyme mixture should contain from about 20 to 250 lipase units per gram and from about 500 to 7,000 protease units per gram. A lipase unit is defined as that amount of the enzyme which will hydrolyze 0.885 grams of olive oil calculated as triolein to diolein and oleic acid in two hours at 37°C. A protease unit is defined as that amount of the enzyme which will digest 1 mg. of casein in one minute at 50°C at pH 7.5. Pancreatic lipase, which is an enzyme mixture containing about 220 lipase units per gram and about 6,000 protease units per gram, is particularly preferred. The exact concentration at which the enzyme mixture is employed is not presently considered critical as long as the enzymes are present in amounts effective, under the desired reaction conditions, to cause an enzymatic reaction resulting in the production of the palatability improving composition. It is typically employed in amounts sufficient to supply from about 20 to 250 lipase units and about 500 to 7,000 protease units per 100 grams fat. The enzyme mixture can be admixed with the reaction mixture at any time before, during or after emulsification. Admixture after emulsification is, however, preferred.

To effect the reaction in the case where the protein comprises a proteinaceous emulsifier that fat is admixed in liquid form with an aqueous dispersion containing the proteinaceous emulsifier, vigorously agitated to effect emulsification, admixed with the enzyme mixture and maintained at suitable reaction conditions for a period of time sufficient to effect the reaction. Where the fat is normally solid or plastic, it is preferably melted to the liquid state. The relative amounts of fat and water necessary for the reaction are not presently considered critical, but are desirably present at a fat to water ratio of from about 1:100 to 10:1, and preferably from about 1:4 to 1:1. The reaction mixture may also contain a promoter such as calcium chloride and sodium chloride.

It has been found that temperatures within the range of from about 35° to 50°C are effective for both heating the reactants prior to admixture and for maintaining the reaction. This temperature range is therefore preferred; however, any reaction temperature effective to sustain the enzymatic reaction resulting in the production of the palatability improving composition can be employed. It is noted that lower temperatures can be employed with somewhat diminished results due to incomplete emulsification and reduced reaction rates. Also, somewhat higher temperatures can be employed but are generally more costly than the increased reaction rates will justify. The aqueous emulsifier dispersion, which may also contain the promoter, is preferably brought to a boil for about 10 minutes and then reduced to 35°–50°C for admixture with the fat.

After emulsification, the enzyme mixture is admixed with the emulsion and constant efficient stirring is maintained for the reaction period to maintain a desirably high rate of reaction. The reaction will be continued for a period of time effective to sustain the enzymatic reaction resulting in the production of the palatability improving composition. Generally, it will be continued for a period of time ranging from about 5 minutes to 16 hours, typically from 15 minutes to two hours.

It has been determined that the pH during reaction has an effect on palatability, with alkaline reaction conditions producing the more preferred results; however, the pH can be maintained at any level which is effective to sustain the enzymatic reaction resulting in the production of the palatability improving composition. Typically, the pH is adjusted periodically to bring it to within the range of from about 4 to 9, preferably about 7 to 9, and most preferably from about 8.0 to 8.5.

After the desired period of reaction, the emulsion can be treated to inactive the enzymes. Typically, it can be heated to an elevated temperature, on the order of about 70° to 95°C, for a period of time sufficient to inactivate the enzymes, on the order of about 5–15 minutes.

The palatability improving composition is preferably maintained in the emulsified state for incorporation into the animal food. The emulsion can, if desired, be cooled or frozen and stored for extended periods of time.

The palatability improving composition can be incorporated into the animal food in any suitable manner. Application by spraying is particularly preferred for dry animal foods because it allows uniform surface application without breaking the emulsion. This makes it possible to obtain improved palatability with significantly smaller amounts of the palatability improving composition. Typical of a suitable device for spraying the emulsion onto the animal food is a spray gun of the kind commonly employed in spray painting. While the fat to water ratio of the emulsion is not believed to be critical during application of the emulsion to the animal food, it generally ranges from 1:5 to 1:1, and typically about 1:4. Where it is desired that the animal food have an outer coating of an unconditioned fat along with the palatability improving composition, the two materials can be applied sequentially or simultaneously. Preferably, the unconditioned fat is applied first, and the palatability improving composition is applied thereover. The animal food can be dried after incorporation of the palatability improving composition to reduce the moisture content to the desired level.

The palatability improving composition prepared in this manner is generally applied in any effective amount. It has been found in practice that amounts as low as about 0.1 percent by weight based on the total weight of the animal food has provided significant improvement in palatability for dogs. Generally, amounts of greater than about 5 percent by weight based on the total weight of the animal food are not employed unless the animal food so treated is later diluted with another material such as untreated animal food, meat scraps, water, or the like.

In the case where the fat-protein mixture comprises a proteinaceous ingredient of the animal food, such as a meat slurry the reaction according to the present invention is preferably effected by heating the slurry to reaction temperature and admixing the enzyme mixture therewith. Constant, efficient stirring is maintained for the duration of the reaction. The natural emulsifying effect of the conventional meat slurrying process may be sufficient to emulsify the fat in the slurry. However, it is preferred to add an emulsifier to obtain a more stable emulsion. The pH, temperature and reaction time for this embodiment are controlled in the same manner as in the embodiment wherein the protein comprises a proteinaceous emulsifier.

This enzyme-treated meat slurry, which is the palatability improving composition in this embodiment, is admixed with the other ingredients of an animal food, such as fat, carbohydrate, protein, vitamins and minerals in any effective amount to provide an animal food of improved palatability. The enzyme-treated meat slurry can generally comprise from about 1 to about 35 percent, and preferably from about 5 to 30 percent, of the animal food. As a guideline to an upper limit, it is noted that high concentrations seem to adversely affect the texture of the animal food, and should be avoided where the impairment of the texture outweighs the improvement in palatability.

While the palatability improving compositions prepared according to the present invention can improve the palatability of animal foods generally, they are especially suitable for use with nutritionally balanced foods comprising protein, fat, carbohydrate, vitamins and minerals. Particularly significant and dramatic increases in palatability have been noted with dry animal foods of the type described in U.S. Pat. No. 3,365,297 to H. M. Burgess et al., and intermediate moisture animal foods such as those described in U.S. Pat. Nos. 3,482,985 and 3,615,625 to H. M. Burgess et al., and U.S. Pat. No. 3,623,884 to G. J. Hass. High moisture or canned-type animal foods can also be successfully treated according to the present invention. The disclosures relating to animal food formulations in the above mentioned patents are incorporated by reference.

The following examples are presented for the purpose of further illustrating and explaining the present invention and are not to be taken as limiting in any sense. Unless otherwise indicated, all parts and percentages are by weight.

EXAMPLE I

This example illustrates a preferred procedure for conditioning a fat-protein mixture according to the present invention. Promine D soy isolate (120 g), a proteinaceous emulsifier, was dispersed in 3.2 liters of an aqueous solution which was 0.0066 M with respect to $CaCl_2$ and 0.5 M with regard to NaCl. This mixture was brought to a boil with a steam coil and held at this temperature for about 10 minutes. The mixture was then cooled to 50°C and the pH was adjusted to 8.0–8.5 and 800 grams of melted bleachable fancy tallow was added. The mixture was then homogenized by mixing in a Waring blender at high speed for three minutes. The pH was adjusted to the indicated range by the addition of sodium hydroxide when necessary. To the homogenized mixture was added 8 grams of pancreatic lipase 250, available from Miles Laboratories. The reaction mixture was incubated for about two hours while adjusting the pH to 8.0–8.5 every thirty minutes. At the conclusion of the conditioning reaction, the material was frozen.

EXAMPLE II

This example illustrates a preferred method according to the present invention for preparing an animal food of enhanced palatability. The frozen emulsion prepared in Example I was thawed in warm water for application to an animal food. In those instances where a quantity of the emulsion broke upon thawing, it was reemulsified by homogenizing in a Waring blender at high speed for about three minutes. This emulsion was applied to a commercially-available, granular, dry animal food having a coating amounting to 3 percent by weight of non-conditioned bleachable fancy tallow, a moisture content of 9 percent and having the following dry basis formulation: 40.4% corn; 23.1% soya meal; 20.8% wheat middlings 11.6 to 50% meat meal, and 4.1% vitamin, mineral, dye and flavoring mix. The emulsion contained about 20 percent of the enzyme-conditioned fat-protein mixture and was sprayed onto the animal food by means of a spray gun into a cement mixer containing the dry food to give an enzyme-conditioned fat-protein mixture content of 1 percent. The animal food was then dried by heating for 5 to 10 minutes at 90°–110°C to reduce the final moisture content of the animal food to about 8–12 percent.

EXAMPLE III

This example illustrates the dramatic increase in palatability of animal foods which can be obtained according to the present invention. In each of the 21 runs listed in Tables I, II, and III, a fat was emulsified and conditioned with an enzyme mixture comprising protease and lipase. The fats were conditioned according to the procedure of Example I while varying the particular fats and reaction conditions as indicated in the tables. Non-proteinaceous emulsifiers were employed in runs 6, 7 and 21. The enzyme-conditioned fat was heated to 95°C where indicated to inactivate the enzymes. The enzyme-conditioned fats were applied by spraying in the indicated amounts onto an animal food according to the procedure of Example II to give a total fat coating on the animal food of 4 percent. The remainder of this fat was unemulsified, unconditioned bleachable fancy tallow (BFT). Animal foods prepared in this manner are identified by the letter L under the headings *Treatment*, *Type* in the tables below.

For comparison, three other types of animal foods were prepared:

1. type E, contained the same fat employed in the animal food identified by L in a given run. Here the fat was emulsified, but not conditioned with the enzyme mixture according to the present invention;

2. type U, contained the same fat employed in type L in a given run; however, the fat was neither emulsified nor conditioned with the enzyme mixture; and 3. as a base line control, in all of the runs except 4–8, 10 and 20 where the type U animal food was the control, an animal food containing the total 4 percent fat as a coating of unemulsified, unconditioned bleachable fancy tallow was employed.

According to this example, 40 dogs of mixed breed were fed the various foods as indicated in the tables and their relative preferences were recorded and objectively compared. The results of the test are expressed in terms of an average preference rating (APR). The APR values relate to comparisons with a control and are defined as follows:

| APR Rating | Response |
| --- | --- |
| 2.0 or greater | Strong preference |
| 0.80 to 1.99 | Moderate preference |
| 0.0 to 0.79 | No preference |
| −0.00 to −0.79 | No rejection |
| −0.8 to −1.99 | Moderate rejection |
| −2.0 or less | Strong rejection |

The results of these tests are summarized in Tables I, II and III. It will be noticed that Runs 2 and 3, which compare a type U fat to the baseline control indicate a preference between two different lots of bleachable fancy tallow. This is explained by the fact that no two samples are exactly alike, but vary according to their preparation and storage histories.

TABLE I

| Run | Fat Type | wt. % | Treatment Type | pH | Enzymes | Emulsifier | Post Heat | APR |
|---|---|---|---|---|---|---|---|---|
| 1 | BFT | 1.0 | L | 8.0 | P[a] | S[c] | no | 1.18 |
|   | BFT | 1.0 | L | 8.0 | F[b] | S | no | 0.65 |
|   | BFT | 1.0 | L | 8.0 | P | S | no | 1.89 |
| 2 | BFT | 1.0 | E | 8.0 | — | S | no | 0.47 |
|   | BFT | 1.0 | U | 8.0 | — | — | no | −0.62 |
|   | BFT | 1.0 | L | 7.94 | P | S | no | 3.20 |
| 3 | BFT | 1.0 | L | 4.0 | P | S | no | 2.10 |
|   | BFT | 1.0 | U | 8.0 | — | — | no | 1.43 |
|   | BFT | 2.0 | L | 8.0 | P | S | no | 1.236 |
| 4 | BFT | 2.0 | E | 8.0 | — | S | no | 1.88 |
|   | BFT | 2.0 | U | 8.0 | — | — | no | 0 |
|   | BFT | 1.0 | L | 8.0 | P | S | no | 2.638 |
| 5 | BFT | 1.0 | E | 8.0 | — | S | no | 2.027 |
|   | BFT | 1.0 | U | 8.0 | — | — | no | 0 |
|   | BFT | 1.0 | L | 8.0 | P | SSL[d] | no | 0.486 |
| 6 | BFT | 1.0 | E | 8.0 | — | SSL | no | 0.347 |
|   | BFT | 1.0 | U | 8.0 | — | — | no | 0 |
|   | BFT | 1.0 | L | 8.0 | P | SMG[e] | no | 1.614 |
| 7 | BFT | 1.0 | E | 8.0 | — | SMG | no | −0.208 |
|   | BFT | 1.0 | U | 8.0 | — | — | no | 0 |
|   | BFT | 1.0 | L | 8.0 | P | S | yes | 1.263 |
| 8 | BFT | 1.0 | L | 8.0 | P | S | no | 0.944 |
|   | BFT | 1.0 | U | 8.0 | — | — | no | 0 |

[a] pancreatic lipase
[b] fungal lipase
[c] soy isolate proteinaceous emulsifier (Promine D)
[d] sodium stearoyl-2-lactylate (Emplex)
[e] succinoylated monoglycerides (SMG)

TABLE II

| Run | Fat Type | wt % | Treatment Type | pH | Time (hrs) | APR |
|---|---|---|---|---|---|---|
| 9 | Butter oil | 1.0 | L | 8.0–8.2 | 2 | 2.70 |
|   | Butter oil | 1.0 | U | 8.0–8.2 | 2 | 2.29 |
|   | Butter oil | 1.0 | L | 8.0–8.2 | 2 | 2.38 |
| 10 | Butter oil | 1.0 | E | 8.0–8.2 | 2 | 1.35 |
|   | Butter oil | 1.0 | U | 8.0–8.2 | 2 | 0 |
|   | Butter oil | 1.0 | L | 8.0–8.2 | 2 | 0.27 |
| 11 | Butter oil | 1.0 | E | 8.0–8.2 | 2 | −0.08 |
|   | Butter oil | 1.0 | U | 8.0–8.2 | 2 | −0.27 |
|   | Butter oil | 1.0 | L | 8.0–8.2 | 2 | −1.1 |
| 12 | Butter oil | 1.0 | E | 8.0–8.2 | 2 | 1.1 |
|   | Butter oil | 1.0 | U | 8.0–8.2 | 2 | 0.8 |
| 13 | Butter oil | 1.0 | L | 8.0–8.2 | 2 | 2.35 |
|   | Butter oil | 1.0 | E | 8.0–8.2 | 2 | 2.30 |
| 14 | Butter oil | 0.5 | L | 8.0–8.2 | 2 | 2.20 |
|   | Butter oil | 0.5 | E | 8.0–8.2 | 2 | 2.79 |
| 15 | Butter oil | 0.25 | L | 8.0–8.2 | 2 | 0.93 |
|   | Butter oil | 0.25 | E | 8.0–8.2 | 2 | 0.27 |
| 16 | Butter oil | 0.10 | L | 8.0–8.2 | 2 | 1.21 |
|   | Butter oil | 0.10 | E | 8.0–8.2 | 2 | 1.18 |
| 17 | Butter oil | 0.5 | L | 8.0–8.2 | 16 | 1.53 |
|   | Butter oil | 0.5 | E | 8.0–8.2 | 16 | 1.75 |
| 18 | Butter oil | 1.0 | L | 8.0–8.2 | 2 | 2.15 |
|   | Butter oil | 1.0 | E | 8.0–8.2 | 2 | 1.47 |
|   | Butter oil | 1.0 | L | 7.3 | 2 | 3.66 |
| 19 | Butter oil | 1.0 | L | 4.0 | 2 | 2.72 |
|   | Butter oil | 1.0 | U | 8.0 | 2 | 3.10 |

TABLE III

| Run | Fat Type | wt % | Treatment Type | pH | Emulsifier | Time (hrs.) | APR |
|---|---|---|---|---|---|---|---|
| 20 | Chicken fat | 1.0 | L | 8.0 | S | 2 | 2.18 |
|   | Chicken fat | 1.0 | L | 8.0 | S | 4 | 1.77 |
|   | Chicken fat | 1.0 | E | 8.0 | S | 0 | 1.62 |
|   | Chicken fat | 1.0 | U | 8.0 | — | — | 0 |
| 21 | Chicken fat | 1.0 | L | 8.0 | SMG | 2 | 1.208 |
|   | Chicken fat | 1.0 | E | 8.0 | SMG | 2 | 1.208 |

EXAMPLE IV

This example illustrates another preferred method according to the present invention for conditioning a fat-protein mixture according to the present invention. An admixture containing about 53.6% tripe, 15.8% trimmings, 3.9% defatted beef tissue, 1.7% lungs, 1.1% emulsifier, 12.9% propylene glycol, 6.4% corn syrup, and 4.6% water was pulverized in a homogenizer to obtain a meat slurry. Four hundred pounds of this meat slurry is brought to 50°C with efficient stirring. The pH is adjusted to 8.0–8.5 by the addition of 2N NaOH. Then, 0.36 pounds of Miles Laboratories pancreatic lipase 250, equivalent to 1 percent of the fat in the meat slurry, is added to the slurry. Constant efficient stirring is maintained for the 37 minute reaction period, during which the pH is monitored continuously. Each time the pH drops to 7.8, sufficient 2N NaOH is added to raise the pH to about 8.2. The pH is adjusted to 8.2 at the conclusion of the reaction, and the mixture is heated to 90°–95°C to inactivate all enzymes.

EXAMPLE V

This example illustrates another preferred method according to the present invention for preparing an animal food of enhanced palatability. Three separate portions enzyme-treated meat slurry prepared in Example IV are blended with additional amounts of the untreated meat slurry to obtain combined slurries containing 11.2, 33.6 and 67.2 percent of the enzyme-treated slurry. Then, 44.6 parts of each of these combined slurries is admixed with 1.9 parts of soya hulls, 5.9 parts of a vitamin, mineral, flavoring and dye mix, 15.7 parts sucrose, and 31.9 parts of soya flakes. These admixtures are then extruded through a cooled extruder to form three animal foods: the first containing 5 percent of the enzyme-treated meat slurry; the second, 15 percent; and the third, 30 percent.

EXAMPLE VI

This example illustrates the improvement in palatability which can be obtained according to the present invention. The three animal foods prepared according to the procedure of Example V are tested and compared to an animal food identical in all respects, except containing no enzyme-treated fat-protein mixture as a control. Forty dogs of mixed breed were fed the four animal foods and their preferences recorded in terms of the APR as explained in Example III. The results are shown below in Table IV.

TABLE IV

| Run | % enzyme-treated meat slurry | APR |
|---|---|---|
| 1 | 0 | 0 |
| 2 | 5 | 2.27 |
| 3 | 15 | 2.35 |
| 4 | 30 | 3.79 |

Many modifications and variations of the present invention will become apparent to those skilled in the art upon reading the above disclosure. It is intended that all such modifications and variations be included within the scope of the present invention which is defined by the following claims.

What is claimed is:

1. A process for improving the palatability of an animal food which comprises:
   conditioning an aqueous meat slurry, comprising fat and protein, by emulsifying the fat in the meat slurry with the water present in the slurry, and treating the meat slurry, containing the emulsified fat and the protein, with an enzyme mixture comprising lipase and protease in amounts effective to cause an enzymatic reaction resulting in the production of a palatability improving composition; and
   incorporating the palatability improving composition into the animal food in an amount which is effective to increase the palatability of the animal food.

2. A process according to claim 1 wherein the palatability improving composition is incorporated into the animal food by admixing it with a mixture comprising fat, carbohydrate, protein, vitamins and minerals and extruding this admixture.

3. A process according to claim 2 wherein the animal food is a dog food.

4. A process according to claim 1 wherein the conditioning step further includes:
   heating the slurry;
   admixing the enzyme mixture therewith; and
   constantly efficiently stirring this admixture under conditions of pH and temperature and for a time effective to cause the enzymatic reaction resulting in the production of the palatability improving composition.

5. A process according to claim 4 wherein the palatability improving composition is employed in an amount of from about 5 to about 30 percent, based on the weight of the animal food.

6. A process according to claim 5 wherein the palatability improving composition is incorporated into the animal food by admixing it with a mixture comprising fat, carbohydrate, protein, vitamins and minerals and extruding this admixture.

7. A process according to claim 6, wherein the animal food is a dog food.

8. A process according to claim 7 wherein the pH is maintained at a level of from about 4 to about 9.

9. A process according to claim 8 wherein the pH is maintained at a level of from about 7 to 9.

10. A process according to claim 9 wherein the pH is maintained at a level of from about 8.0 to 8.5.

11. A process according to claim 7 wherein the temperature is maintained at a level of from about 35° to 50°C.

12. A process according to claim 7 wherein the lipase is employed in an amount of from about 20 to 250 lipase units per 100 grams of fat.

13. A process according to claim 12 wherein the enzyme mixture comprises pancreatic lipase.

14. A process according to claim 9 wherein the lipase is employed in an amount of from about 20 to 250 lipase units per 100 grams of fat.

15. A process according to claim 14 wherein the enzyme mixture comprises pancreatic lipase.

16. A process according to claim 14 wherein the temperature is maintained at a level of from about 35° to 50°C.

17. A process for improving the palatability of an animal food which comprises:
   conditioning a mixture comprising fat and protein by providing a liquid fat, admixing the fat with an aqueous solution containing a proteinaceous emulsifier subjecting the emulsified fat and protein mixture to vigorous mixing to effect emulsification, providing in the emulsified fat and protein mixture an amount of an enzyme mixture comprising lipase and protease effective to produce an enzymatic reaction resulting in the production of a palatability improving composition, and constantly efficiently stirring the emulsified fat and protein mixture under conditions of pH and temperature, and for a time, effective to sustain the enzymatic reaction resulting in the production of the palatability improving composition; and
   incorporating the palatability improving composition into the animal food in an amount which is effective to increase the palatability of the animal food.

18. A process according to claim 17 wherein the mixture comprising lipase and protease comprises pancreatic lipase.

19. A process according to claim 17 wherein the proteinaceous emulsifier comprises a proteinaceous portion of the animal food.

20. A process according to claim 17 wherein the animal food is a dog food.

21. A process according to claim 17 wherein the palatability improving composition is incorporated into the animal food by preparing it in situ.

22. A process according to claim 17 wherein the palatability improving composition is incorporated into the animal food by admixing it therewith.

23. A process according to claim 17 wherein the palatability improving composition is incorporated into the animal food by coating it thereon.

24. A process according to claim 17 wherein the fat to water ratio is within the range of from about 1:4 to 1:1.

25. A process according to claim 17 wherein a promoter is employed in the preparation of the palatability improving composition.

26. A process according to claim 17 wherein the palatability improving composition is sprayed onto the animal food as an emulsion at a fat to water ratio within the range of from 1:5 to 1:1.

27. A process according to claim 17 wherein the palatability improving composition is frozen and then thawed before application to the animal food.

28. A process according to claim 17 wherein the palatability improving composition is heated to an elevated temperature to inactive the enzymes.

29. A process according to claim 17 wherein the emulsifier comprises soy isolate.

30. A process according to claim 17 wherein the palatability improving composition is incorporated into the animal food by spraying it thereon as an emulsion in an amount sufficient to supply from about 0.1 to about 5 percent conditioned fat based on the total weight of the animal food.

31. A process according to claim 30 wherein the emulsifier comprises a soy isolate.

32. A process according to claim 17 wherein the fat comprises an animal fat.

33. A process according to claim 32 wherein the fat comprises butter oil, bleachable fancy tallow or a combination thereof.

34. A process according to claim 33 wherein the enzyme mixture comprises pancreatic lipase.

35. A process according to claim 17 wherein the pH is maintained at a level of from about 4 to about 9.

36. A process according to claim 35 wherein the pH is maintained at a level of from about 7 to 9.

37. A process according to claim 36 wherein the pH is maintained at a level of from about 8.0 to 8.5.

38. A process according to claim 17 wherein the temperature is maintained at a level of from about 35° to 50°C.

39. A process according to claim 17 wherein the lipase is employed in an amount of from about 20 to 250 lipase units per 100 grams of fat.

40. A process according to claim 39 wherein the enzyme mixture comprises pancreatic lipase.

41. A process according to claim 39 wherein the protease is present at a level of from about 500 to 7,000 protease units per 100 grams of fat.

* * * * *

UNITED STATES PATENT OFFICE
CERTIFICATE OF CORRECTION

Patent No. 3,857,968      Dated Dec. 31, 1974

Inventor(s) Gerhard Julius Haas and Joaquin Castro Lugay

It is certified that error appears in the above-identified patent and that said Letters Patent are hereby corrected as shown below:

In Column 3, line 63, after "to" and before "the" change "inactive" to --inactivate--.

In Column 5, line 10, after "G. J." and before "High" change "Hass" to --Haas--.

Signed and sealed this 15th day of July 1975.

(SEAL)
Attest:

RUTH C. MASON
Attesting Officer

C. MARSHALL DANN
Commissioner of Patents
and Trademarks